United States Patent
Delforte

(10) Patent No.: US 12,286,167 B1
(45) Date of Patent: Apr. 29, 2025

(54) LOW-FLOOR BUS SUPPORT STRUCTURE

(71) Applicant: David Thomas Delforte, Canandaigua, NY (US)

(72) Inventor: David Thomas Delforte, Canandaigua, NY (US)

(*) Notice: Subject to any disclaimer, the term of this patent is extended or adjusted under 35 U.S.C. 154(b) by 0 days.

(21) Appl. No.: 18/947,091

(22) Filed: Nov. 14, 2024

Related U.S. Application Data

(63) Continuation-in-part of application No. 18/597,827, filed on Mar. 6, 2024, now Pat. No. 12,179,582.

(51) Int. Cl.
  *B62D 47/02* (2006.01)
  *A61G 3/06* (2006.01)
  *B60P 1/43* (2006.01)

(52) U.S. Cl.
  CPC ............ *B62D 47/02* (2013.01); *A61G 3/061* (2013.01); *B60P 1/433* (2013.01)

(58) Field of Classification Search
  CPC ........ A61G 3/061; A61G 3/062; B62D 47/02; B60P 1/431; B60P 1/433; B60P 1/435
  USPC ......................................................... 414/921
  See application file for complete search history.

(56) References Cited

U.S. PATENT DOCUMENTS

| | | | | |
|---|---|---|---|---|
| 5,975,830 A * | 11/1999 | Goodrich | ............... | A61G 3/062 414/812 |
| 6,071,064 A * | 6/2000 | Hackett | .................. | A61G 3/066 414/812 |
| 8,807,575 B2 * | 8/2014 | Bartel | .................... | B60G 17/00 280/788 |
| 8,967,669 B2 * | 3/2015 | Kane | ...................... | A61G 3/061 180/311 |
| 12,179,582 B1 * | 12/2024 | Delforte | ................ | B60K 17/04 |
| 2016/0243990 A1 * | 8/2016 | Portney | ..................... | B60R 3/00 |
| 2019/0000699 A1 * | 1/2019 | Kitchin | ................... | B60P 1/433 |

* cited by examiner

*Primary Examiner* — Gary S Hartmann
(74) *Attorney, Agent, or Firm* — Jong Patent Firm; Cheng Ning Jong; Tracy P. Jong

(57) ABSTRACT

A support structure for a low-floor bus having front wheels and rear wheels, the support structure including a floor support structure having a front end and a read end, wherein the floor support structure configured to receive front side rails on the front end of the floor support structure and rear side rails on the rear end of the floor support structure, a cutout disposed on a lateral edge of the floor support structure, a plurality of support bearings each attached to a bottom surface of the floor support structure, and a drive shaft including a plurality of shaft segments and a slip joint, all at least partially supported on the plurality of support bearings, the plurality of shaft segments are configured to be disposed around the cutout.

20 Claims, 15 Drawing Sheets

LOW-FLOOR BUS SUPPORT STRUCTURE

PRIORITY CLAIM AND RELATED APPLICATIONS

This continuation-in-part application claims the benefit of priority from non-provisional application U.S. Ser. No. 18/597,827 filed on Mar. 6, 2024. Said application is incorporated by reference in its entirety.

BACKGROUND OF THE INVENTION

1. The Field of the Invention

The present invention relates to a low-floor bus support structure. More specifically, the present invention is directed to a low-floor bus support structure useful for receiving a ramp disposed at significantly horizontal configuration to allow entry of wheelchaired passengers into and exit from a rear-wheel-drive passenger vehicle having such a support structure.

2. Background Art

The majority of low-floor buses are front-wheel-drive vehicles as the modifications required to convert a vehicle to one with a low-floor is much less challenging without the requirement to power the rear axles. The floor of the passenger compartment can be dropped to any height which still affords the vehicle to navigate uneven roadways and speed bumps, etc. However, a front-wheel-drive vehicle having a front-wheel-drive mechanism does not offer the same pavement traction as a vehicle with a rear-wheel-drive mechanism in this sector. A front-wheel-drive mechanism makes it more difficult to "pull" the vehicle in certain geographic areas, e.g., hills, snow, and other elements create difficult driving conditions when a significant amount of weight is disposed in the rear portion of the vehicle when the vehicle is loaded with passengers. Rear-wheel-drive trucks typically have a drivetrain configuration optimized for truck applications, which may not be directly compatible with the requirements of a low-floor bus. Converting such a truck into a bus with a low-floor necessitates modifications to the drivetrain, chassis, and suspension to accommodate the lower floor height without compromising performance, stability, or safety. Achieving a low-floor height in a rear-wheel-drive truck-based bus conversion requires careful consideration of clearance issues. Disposing the floor in a height sufficiently low for the ease of use by wheelchair users while maintaining adequate ground clearance can be challenging, especially when working within the constraints of the existing chassis design and suspension geometry. Converting a truck chassis into a low-floor bus often involves significant structural modifications to the chassis frame, body, and suspension components while requiring that a low-floor be maintained. Reinforcements may be required to support the lower floor and accommodate the additional weight of passengers, seats, and amenities while allowing the rear-wheel-drive drivetrain to function without fail. An entry system that provides easy boarding and disembarking while meeting safety standards and regulatory requirements, is crucial to ensure the ease of use of the bus.

There exists a need in the cutaway market for a low-floor bus that is a rear-wheel-drive vehicle, i.e., a vehicle which has a desirable power distribution to its drivetrain while its usability is maintained as in front-wheel-drive vehicles. There exists a need for a floor support structure which allows such a bus to exist.

SUMMARY OF THE INVENTION

In accordance with the present invention, there is provided a support structure for a low-floor bus having front wheels and rear wheels, the support structure including:
  (a) a floor support structure having a front end and a rear end, wherein the floor support structure configured to receive front side rails on the front end of the floor support structure and rear side rails on the rear end of the floor support structure;
  (b) a cutout disposed on a lateral edge of the floor support structure;
  (c) a plurality of support bearings each attached to a bottom surface of the floor support structure; and
  (d) a drive shaft including a plurality of shaft segments and a slip joint, all at least partially supported on the plurality of support bearings, the plurality of shaft segments are configured to be disposed around the cutout, wherein a first end of the drive shaft is configured to be connected to a power source and a second end of the drive shaft is configured to be connected to a rear differential to drive the rear wheels.

In one embodiment, at least a portion of the drive shaft is configured to be supported by the floor support structure.

In accordance with the present invention, there is further provided a support structure for a low-floor bus having front wheels and rear wheels, the support structure including:
  (a) a floor support structure having a front end and a rear end, wherein the floor support structure is configured to receive front side rails on the front end of the floor support structure and rear side rails on the rear end of the floor support structure;
  (b) a transfer case disposed on the front end of the floor support structure, wherein the transfer case is configured to receive a first drive shaft from the low-floor bus on a first end of the transfer case; and
  (c) a second drive shaft including a slip joint, wherein the transfer case is further configured to receive the second drive shaft at a rear end of the transfer case, wherein the second drive shaft is configured to mechanically connect the transfer case with a differential to drive the rear wheels on a ground, an output of the second drive shaft is configured to be received at the differential and the slip joint is configured to accommodate movements of the differential with respect to the floor support structure while maintaining a mechanical connection between the transfer case and the differential.

In accordance with the present invention, there is further provided a support structure for a low-floor bus having front wheels and rear wheels, the support structure including:
  (a) a floor support structure having a front end and a rear end, wherein the floor support structure is configured to receive front side rails on the front end of the floor support structure and rear side rails on the rear end of the floor support structure;
  (b) a transfer case disposed at the front end of the floor support structure, wherein the transfer case is configured to receive a first drive shaft from the low-floor bus on a first end of the transfer case;
  (c) a plurality of support bearings each attached to a bottom surface of the floor support structure; and
  (d) a second drive shaft including a plurality of shaft segments supported on the plurality of support bearings, wherein the transfer case is further configured to receive a front end of the second drive shaft at a second end of the transfer case and the second drive shaft is configured to be connected to a differential at a rear end of the second drive shaft to drive the rear wheels.

In one embodiment, the slip joint can be a slip yoke or a constant velocity (CV) joint. In one embodiment, at least a portion of the second drive shaft is configured to be supported by the floor support structure. In one embodiment, the floor support structure includes a front manifold, a rear manifold, a support structure connecting the front manifold and the rear manifold and a gap in each of the front manifold and the rear manifold of at least about 6-8 inches in width to accommodate the second drive shaft. In one embodiment, the support structure further includes a second transfer case disposed on the rear end of the floor support structure for receiving the second drive shaft and transferring its motive force to drive the rear wheels. In one embodiment, the second drive shaft is configured to mechanically connect the transfer case with a differential to drive the rear wheels. In one embodiment, the first drive shaft is configured to mechanically connect the transfer case with a transmission of the low-floor bus. In one embodiment, the floor support structure includes a front manifold, a rear manifold and a plurality of beams connecting the front manifold and the rear manifold. In one embodiment, at least one of the plurality of beams can be a C-channel, an I-beam, a hollow channel or a solid bar. In one embodiment, the floor support structure further includes a ramp module configured to be disposed in a cutout of the floor support structure. In one embodiment, the ramp module can be a retractable ramp module or a folding ramp module.

An object of the present invention is to provide a low-floor passenger vehicle support structure that can be adapted to a vehicle with a rear-wheel-drive mechanism.

Another object of the present invention is to provide a low-floor passenger vehicle support structure that can be adapted to a vehicle with a rear-wheel-drive mechanism where a ramp can be mounted in a position to allow a wheelchaired user to enter and exit the vehicle equipped with such a ramp without additional forms of assistance.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
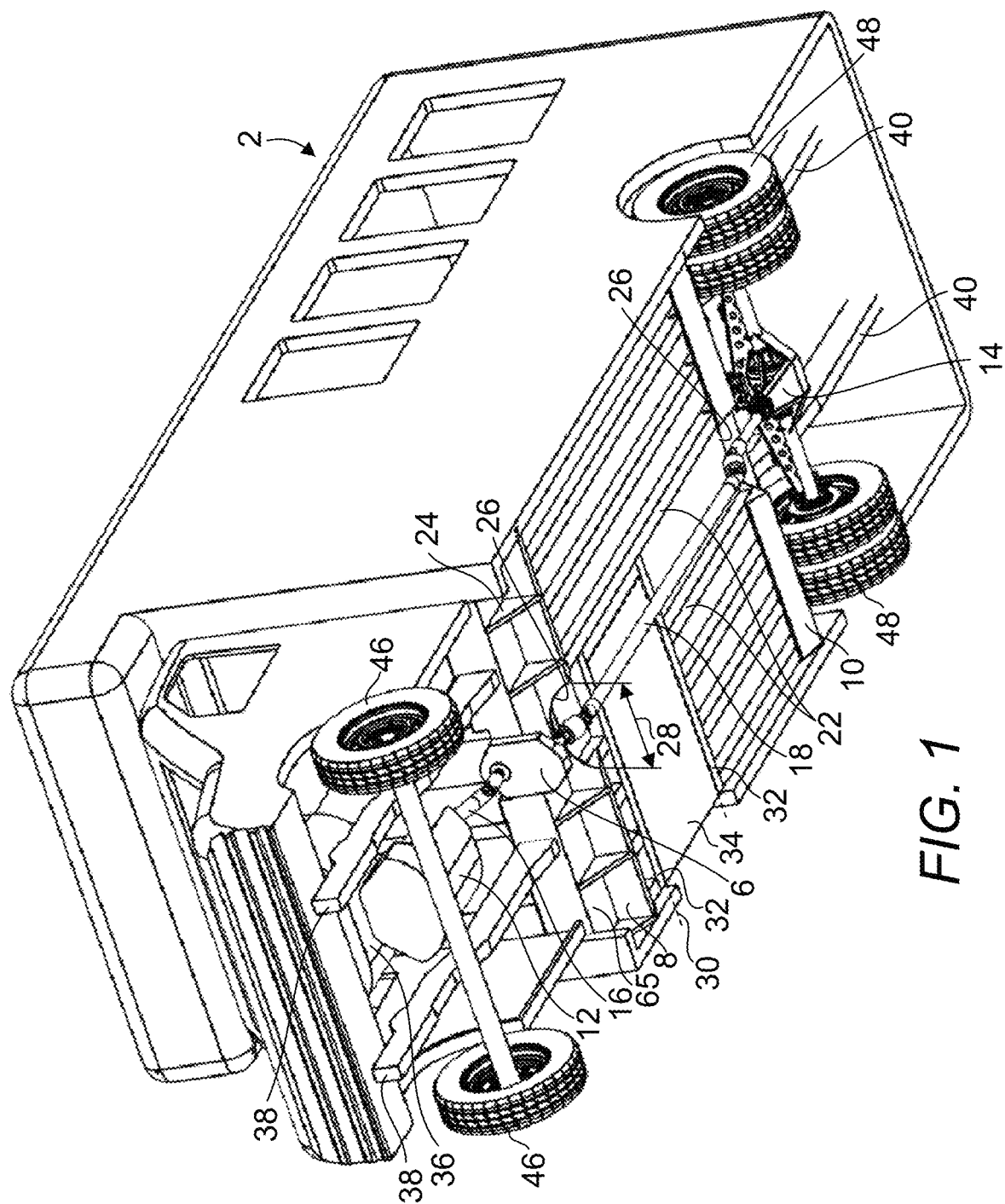
FIG. 1 is a bottom front perspective view of a low-floor bus, depicting a floor support structure suitable for enabling a rear-wheel-drive vehicle to be converted into a low-floor bus.

2—vehicle, e.g., low-floor bus
4—floor support structure
6—first transfer case
8—front manifold
10—rear manifold
12—transmission
14—differential
16—first drive shaft
18—second drive shaft
20—curb
22—beam
24—brace
26—gap
28—width of gap
30—cutout
32—cross beam 34—ramp module, e.g., retractable ramp module or folding ramp module
36—engine
38—front side rail
40—rear side rail
42—ramp
44—floor
46—front wheel
48—rear wheel
50—front plate of front manifold
52—rear plate of front manifold
54—front plate of rear manifold
56—rear plate of rear manifold
58—location at which beam is attached to rear plate of front manifold
60—location at which beam is attached to front plate of rear manifold
62—drive shaft
64—top plate of front manifold or rear manifold
65—bottom plate of front manifold or rear manifold
66—pavement
68—notch
70—side plate of front manifold or rear manifold
72—universal joint
74—cutout
76—clearance
78—distance between top surface of retractable or folding ramp module and pavement
80—cab
82—enclosure which can serve as a passenger compartment
84—depth of notch
86—width of notch
88—second transfer case
90—slip joint, e.g., slip yoke, constant velocity (CV) joint, e.g., double Cardan CV joint
92—shaft segment
94—suspension system component, e.g., leaf spring
96—suspension system component, e.g., shock absorber
98—height difference between differential and drive shaft
100—axle
102—misalignment coupler
104—support bearing
106—universal joint or U-joint
108—up-and-down motion of differential
110—length of floor support structure
112—height of floor support structure including second shaft and support bearing
114—width of floor support structure
116—deviation Particular Advantages of the Invention A present low-floor passenger vehicle support structure can be used with a rear-wheel-drive vehicle. A rear-wheel-drive mechanism offers more superior pavement traction than a front-wheel-drive mechanism in a light duty paratransit vehicle as most of the vehicle weight is disposed over the rear axle. As such, a vehicle having a front-wheel-drive mechanism does not offer the same pavement traction as a vehicle with a rear-wheel-drive mechanism in this sector. A front-wheel-drive mechanism makes it more difficult to "pull" the vehicle in certain geographic areas, e.g., hills, snow, and other elements and creates difficult driving conditions. Further, a present low-floor passenger vehicle support structure can be adapted to a Ford® E Series chassis. As Ford® company continues to produce such vehicles and about 90%-95% of the cutaway market is built on a Ford® E-series chassis, continuity in maintenance and parts for maintenance departments is ensured. A cutaway market in the vehicle industry refers to a segment where vehicles are manufactured as incomplete units, typically lacking the final bodywork. These vehicles are essentially "cutaway" versions, exposing the internal components such as the engine, chassis, and drivetrain. They are often used for specialized purposes such as commercial vans or buses, where the bodywork is added by a separate manufacturer to suit specific needs such as cargo transportation, passenger transport, or recreational vehicles. Cutaway vehicles offer flexibility and customization options, allowing different bodies to be mounted onto the same chassis, depending on the intended use. For instance, a cutaway van chassis might be used for various purposes such as delivery vans, ambulances, shuttle buses, or mobile workshops. This market segment caters to businesses and industries that require vehicles tailored to their specific requirements, offering versatility and adaptability in design and functionality.

The floor design of the present low-floor passenger vehicle support structure allows manufacturers to customize the length of the vehicle according to the needs of the customer as it can be configured in a flat, front to back configuration.

As no crossmembers are used, a vehicle equipped with a present support structure can have a much higher ground-to-floor clearance, reducing the potential for the vehicle body to be damaged in use. Crossmembers are typically used in strengthening a support structure where the crossmembers are typically secured at an elevation different from the elevation of a plurality of beams or joists used as the main support mechanism for a floor, increasing the required height of the floor to accommodate a drive shaft.

As at least a transfer case or a gear box is utilized for transferring the drive torque from an engine of a vehicle to which a present support structure is installed, the drivetrain of the vehicle to which the present support structure is applied, can be made to couple with a rear differential, allowing flexibility in ramp sizes that can be coupled to the structure. The first transfer case installed at the front end the present support structure allows a drive shaft disposed substantially in parallel with the plurality of beams to assume a minimal cross-sectional footprint along the entire length of the drive shaft.

Further, the exhaust system of a vehicle with a present floor support structure can be positioned in a manner and elevation similar to the drive shaft, affording and maintaining the same ground clearance while the exhaust system is protected due to its elevation relative to the ground. As the present support structure provides sufficient space for an electric ramp to be installed, the benefits of such a ramp can be realized. Manual ramps are used on conventional vehicles with low-floors as the drive shafts of such conventional vehicles interfere with the installation of an electric ramp.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
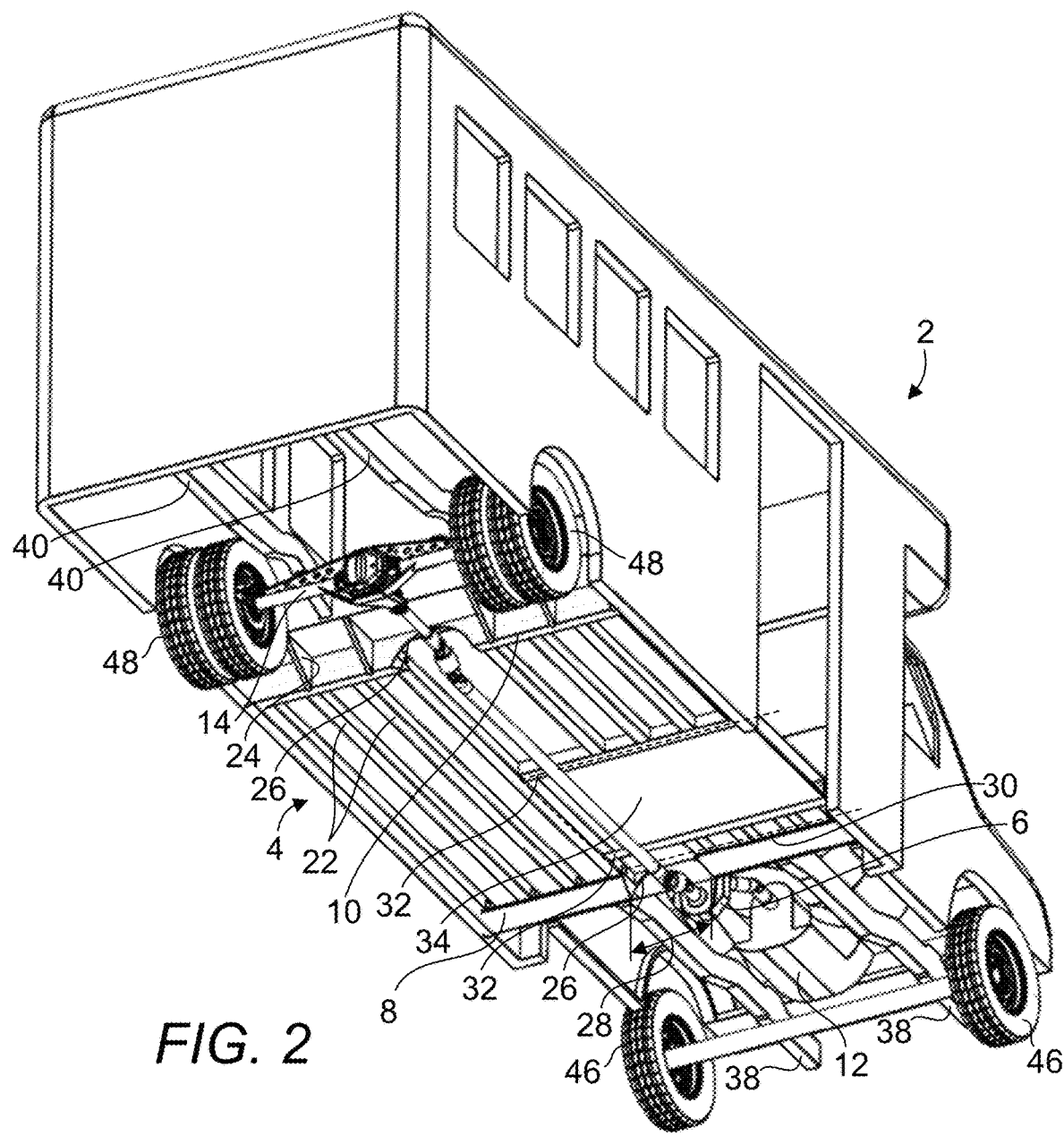
FIG. 2 is a bottom rear perspective view of a low-floor bus, depicting a floor support structure shown in FIG. 1.

A "low-floor bus," is used herein to mean a bus or trolleybus that has no steps between the ground and the floor of the bus at one or more entrances, and low-floor for part or all of the passenger cabin. FIG. 1 is a bottom front perspective view of a low-floor bus 2, depicting a floor support structure suitable for enabling a rear-wheel-drive vehicle to be converted into a low-floor bus. FIG. 2 is a bottom rear perspective view of a low-floor bus, depicting a floor support structure shown in FIG. 1. It shall be noted that the low-floor bus 2 is shown without all components that are normally available on a ramp-equipped low-floor bus, for simplicity and to highlight only the present inventive concepts which enable a rear-wheel-drive vehicle to be constructed as a low-floor bus suitable for use with individuals relying on wheelchairs for their mobility. The low-floor bus may start out as a basic truck marketed by a vehicle manufacturer, e.g., Ford® and Chevrolet®, etc. The basic truck serves as a dependable foundation for specialized applications, e.g., in the mass transport market. Their robust construction and proven performance ensure that the converted truck retains its structural integrity and functionality even after modifications. The high towing capacity and payload ratings of such trucks provide ample room for accommodating additional equipment or passengers in specialized truck conversions.

The benefits for using ubiquitous truck chassis, further lie in the vast aftermarket ecosystem, offering a wide range of aftermarket parts, accessories, and customization options. This extensive support network facilitates the conversion process by providing access to specialized components, upgrades, and modifications tailored to the unique needs of the specialized vehicle application. In modifying a basic truck, each original side rail is first separated into two portions, a front portion that serves as a front side rail and a rear portion that serves as a rear side rail before a present floor support structure is disposed between the front portions and rear portions to connect them to form a single chassis that can subsequently support loads, e.g., passengers, enclosure, etc., disposed atop the chassis. The support structure of the low-floor bus 2 having front ground-contacting wheels 46 and rear ground-contacting wheels 48, is shown disposed between the front ground-contacting and rear ground-contacting wheels 46, 48. The support structure includes a floor support structure 4 and a first transfer case 6. The floor support structure 4 has a front end and a rear end. The floor support structure 4 is configured to receive front side rails 38 on the front end of the floor support structure 4 and rear side rails 40 on the rear end of the floor support structure 4. The first transfer case 6 is disposed on the front end of the floor support structure 4, wherein the first transfer case 6 is configured to receive a first drive shaft 16 from the low-floor bus on a first end of the first transfer case 6 and to receive a second drive shaft 18 on a rear end of the first transfer case 6. The second drive shaft 18 is configured to drive the rear ground-contacting wheels 48. The transfer case 6 is located between the transmission 12 located at the front end of the chassis including the front side rails 38 and differential 14 located at the rear end of the chassis including the rear side rails 40. As used herein, the primary function of the transfer case 6 is to take power from a transmission output shaft and send this power rearward to the rear axles via the differential 14 while providing a sufficient offset in distance from its input from the first drive shaft 16 connected to transmission 12 to output to the second drive shaft 18 connected to the differential 14. This offset allows the transmission of power to the differential 14 to be placed at a lower elevation to accommodate the support structure supporting the floor 44. The floor may be constructed from a base layer of load-bearing material and a non-skid surface disposed above the base layer. The transfer case 6 receives power from the transmission 12 through an input shaft 16. This input shaft 16 connects to the transmission output shaft and transfers rotational power to the transfer case 6. For a rear-wheel-drive vehicle, only one output shaft is disposed inside the transfer case 6 as power is only required at the rear axles. The differential 16 then distributes power to the individual rear wheels 48. The transfer case 6 may have high-range and low-range gearing to provide different levels of torque multiplication to supply sufficient power and torque to navigate steep inclines effectively while maintaining adequate speed and control. The transfer case 6 may incorporate gears or chains to allow for different gear ratios, which can be useful for adapting to various driving conditions.

In the embodiment shown, the floor support structure 4 includes a front manifold 8, a rear manifold 10, a substantially planar support structure connecting the front manifold 8 and the rear manifold 10, a gap 26 in each of the front manifold and the rear manifold of at least about 6-8 inches in width 28 to accommodate the second drive shaft 18. The second drive shaft 18 is configured to mechanically connect the first transfer case 6 with a differential 14 to drive the rear ground-contacting wheels 48. The first drive shaft 16 is configured to mechanically connect the first transfer case 6 with a transmission 12 of the low-floor bus. The transmission 12 in turn receives power from an engine 36. In the embodiment shown, the support structure includes a front manifold 8, a rear manifold 10 and a plurality of beams 22 connecting the front manifold 8 and the rear manifold 10 at locations 58 and 60. The floor support structure further includes a cutout 30 disposed in the floor support structure, the cutout 30 is configured for accommodating a ramp module 34. Each beam 22 can be a C-channel, an I-beam, a hollow channel or a solid bar. A beam 22 may be permanently fixed to a manifold 8, 10 by welding one end of the beam 22 to the manifold 8, 10 although it would also be possible to connect a beam to a manifold 8, 10 by fastening one end of the beam 22 to a manifold 8, 10. The attachment of a beam 22 to a manifold 8, 10 can be improved by first welding or otherwise attaching a socket to a surface of the manifold 8, 10, and the end of the beam 22 is inserted into the socket. Fasteners, e.g., bolts or screws, may then be used to secure the beam 22 in place within the socket. The beam 22 may alternatively be welded to the socket. This provides a snug fit and distributes the load across a larger area, enhancing the stability of the joint. In another example, one or more bracket may be used instead. Here, at least one bracket or cleat is welded or otherwise attached to a surface of the manifold 8, 10. Again, fasteners, e.g., bolts or screws, may then be used to secure the beam 22 in place to the bracket or the beam 22 may alternatively be welded to the bracket. In either example, a beam 22 is designed to interlock securely to a socket or a bracket, providing alignment and support for the beam 22 to ensure structural integrity and safety. In the embodiments shown throughout, universal joints 72 are used in drive shafts 16, 18 to allow the transfer of power via an aggregate of drive shafts including drive shafts 16, 18 while not interfering with the support structure made up of beams 22. In one embodiment, the clearance 76 (see FIG. 6) afforded by the present floor support structure is about 7 inches while the top surface of the ramp module 34 is disposed at about 11-12 inches from the pavement 68.

Figure 3:
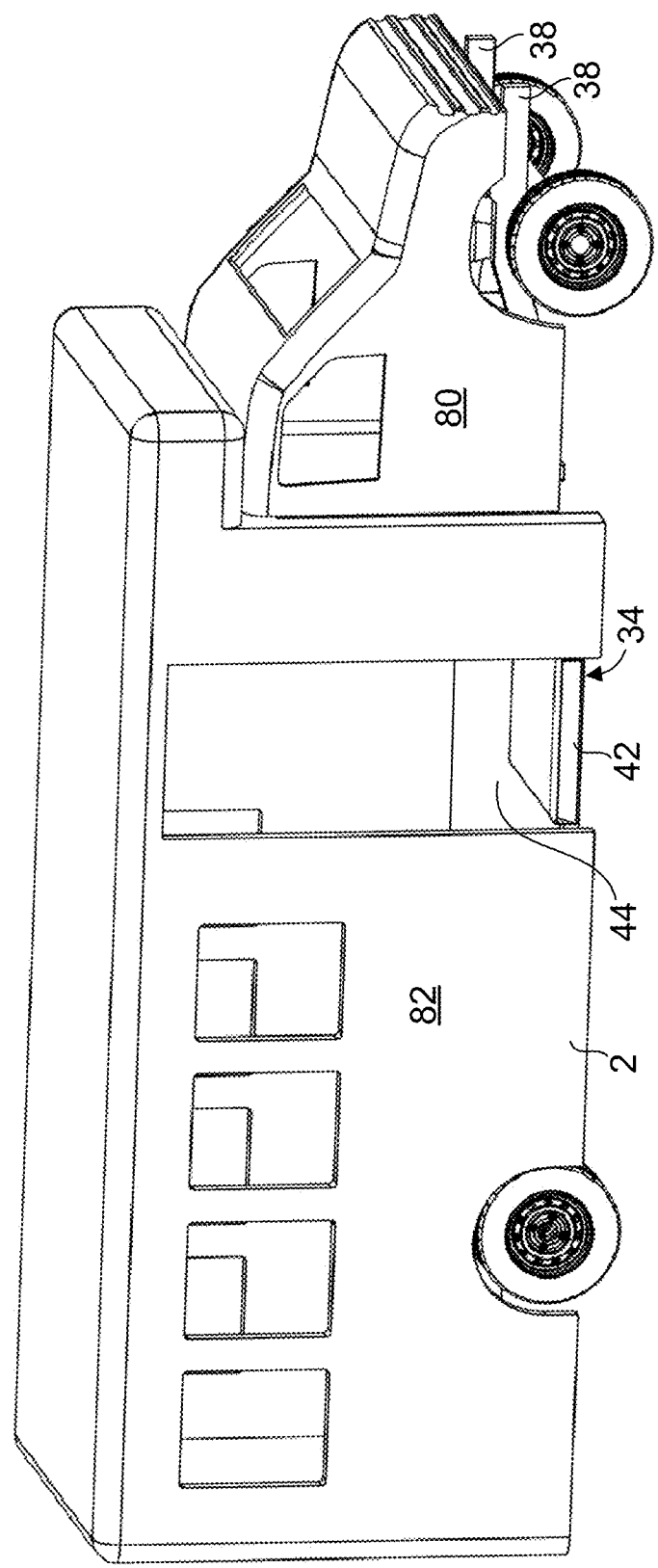
FIG. 3 is a right side view of a low-floor bus, depicting a floor support structure shown in FIG. 1 with a ramp of the low-floor bus disposed in a retracted position.
Figure 4:
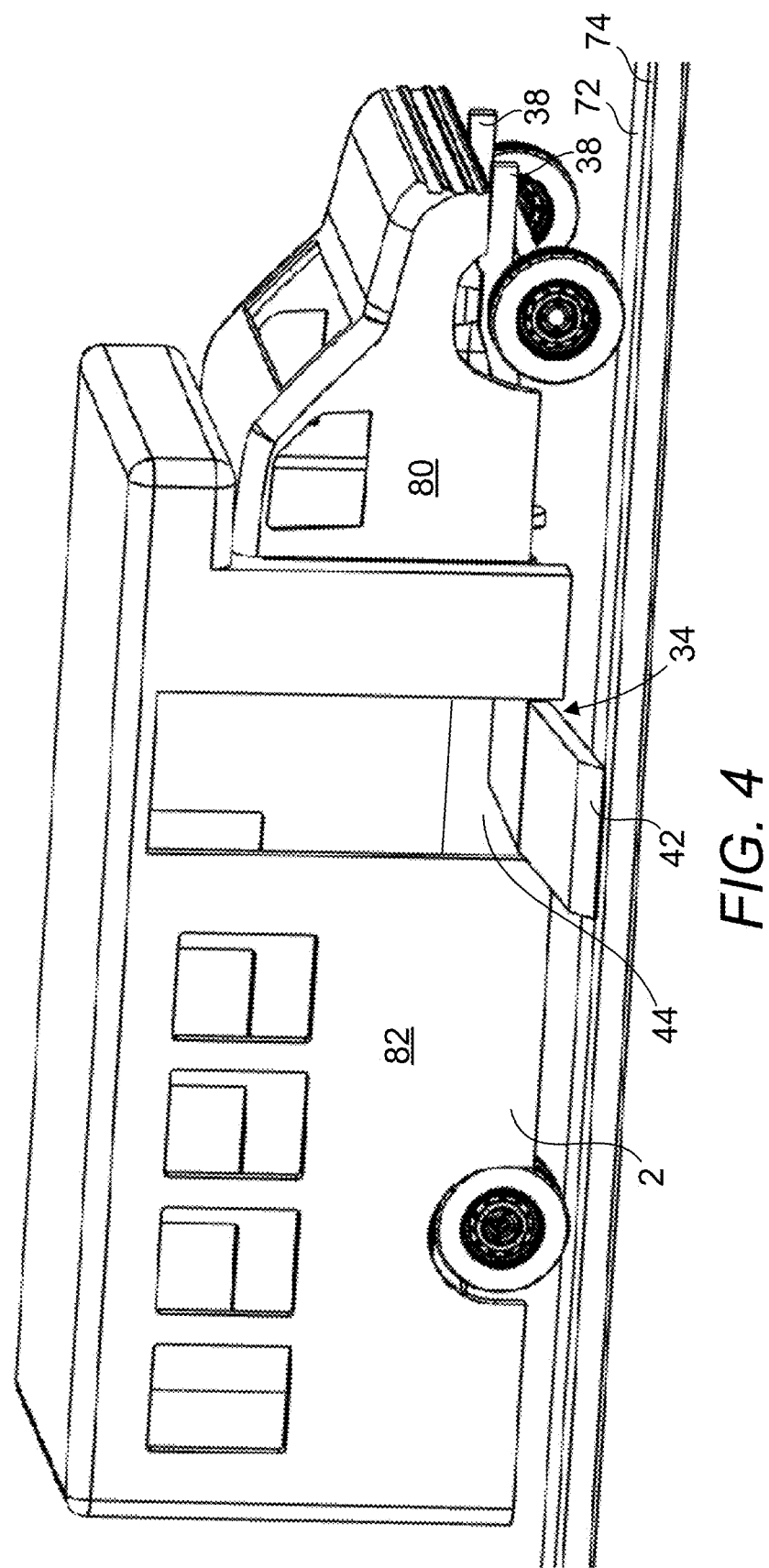
FIG. 4 is a right side view of a low-floor bus, depicting a floor support structure shown in FIG. 1 with a ramp of the low-floor bus disposed in an extended position.

FIG. 3 is a right side view of a low-floor bus, depicting a floor support structure shown in FIG. 1. Referring to FIGS. 1-3, it shall be noted that in order to dispose a ramp at a level similar to other parts of the floor, a cutout 30 in the floor is necessary. A retractable or folding ramp, i.e., one configured to be retractable or folded while not in use and extendable or unfolded as shown in FIG. 4 when it is in use, may be installed underneath a floor panel disposed over the opening made available by the cutout 30. Alternatively, a ramp module 34 may be disposed in this slot, occupying it to provide a platform upon which a user can be supported while entering the bus 2 or while preparing to exit the bus 2. The ramp module 34 may include a ramp 42 operationally connected to an actuator, e.g., a motorized mechanism including motors, gears and hydraulic/pneumatic cylinders configured to position the ramp in its desired position, e.g., retracted/folded or extended/unfolded position. The ramp module 34 may alternatively be manually operated. In its extended position, the ramp facilitates the entry or exit of a wheelchair user as the ramp 42 is placed upon a surface accessible to the wheelchair user. Referring back to FIGS. 1 and 2, cross beams 32 are used to line two edges of the cutout 30 to facilitate the installation of the ramp module 34. As cross beams 32 serve as two of the edges of the cutout 30 and have a height identical to the beams 22, the cross beams 32 do not protrude below the bottom surfaces of the beams 22.

Figure 5:
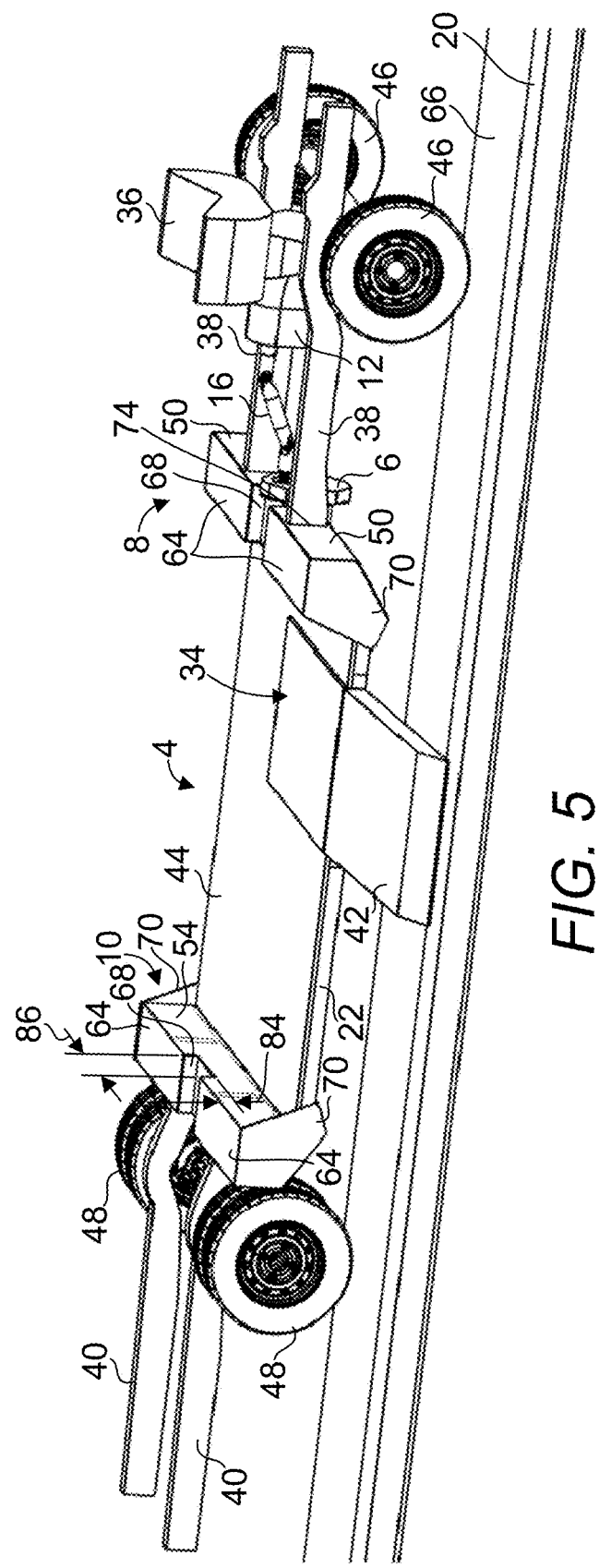
FIG. 5 is a top right side perspective view of a low-floor bus, depicting a floor support structure shown in FIG. 1 with a ramp of the low-floor bus disposed in an extended position with the enclosure and cab removed to reveal details of the manifolds.
Figure 6:
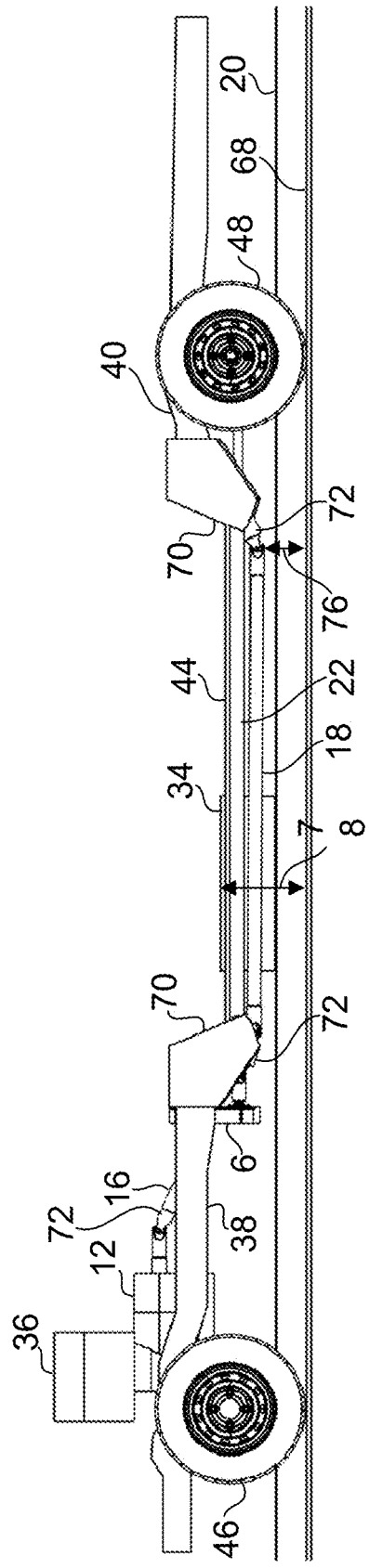
FIG. 6 is a left side view of a low-floor bus, depicting a floor support structure shown in FIG. 1 with a ramp of the low-floor bus disposed in an extended position with the enclosure and cab removed to reveal details of the manifolds.
Figure 7:
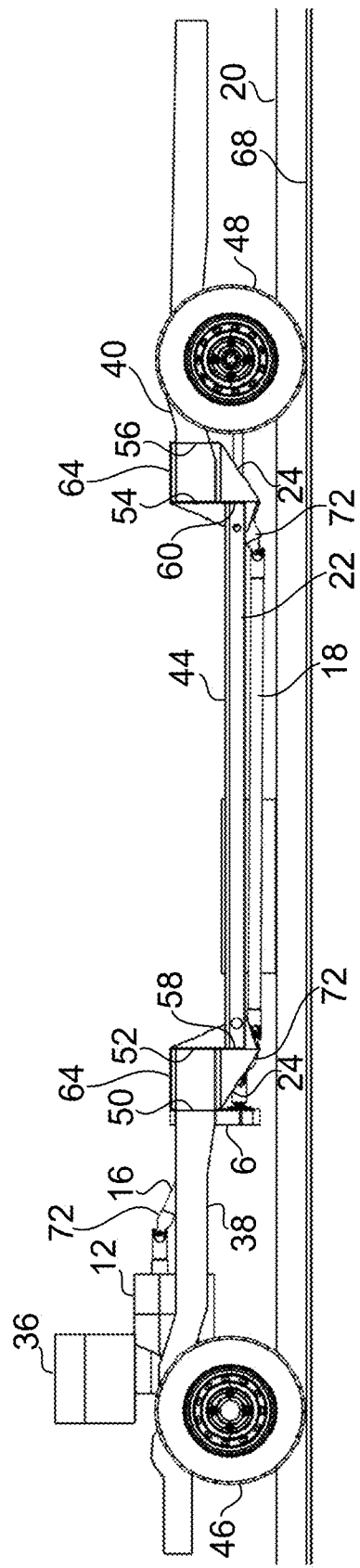
FIG. 7 is a left side view of a low-floor bus, depicting a floor support structure shown in FIG. 1 with a ramp of the low-floor bus disposed in an extended position with the enclosure, cab and side plates of the manifolds removed to reveal details of the manifolds.

FIG. 5 is a top right side perspective view of a low-floor bus, depicting a floor support structure shown in FIG. 1 with a ramp of the low-floor bus disposed in an extended position with the enclosure 82 and cab 80 removed to reveal details of the manifolds 8, 10. FIG. 6 is a left side view of a low-floor bus, depicting a floor support structure shown in FIG. 1 with a ramp of the low-floor bus disposed in an extended position with the enclosure 82 and cab 80 removed to reveal details of the manifolds 8, 10. FIG. 7 is a left side view of a low-floor bus, depicting a floor support structure shown in FIG. 1 with a ramp of the low-floor bus disposed in an extended position with the enclosure 82, cab 80 and side plates 70 of the manifolds removed to reveal details of the manifolds 8, 10. In FIGS. 5-7, the ramp 42 is shown disposed in an extended position on a curb 20 to facilitate the entry or exit of a user into the low-floor bus. It shall be noted that a front side rail 38 is secured to two plates, i.e., plates 50, 52 of manifold 8. In fixing a front side rail 38 to manifold 8, a cutout or hole 74 is provided in plate 50 to allow the front side rail 38 through the cutout until its end hits plate 52. As such, plate 52 serves as a stop or backing plate for the front side rail 38 which is then welded to manifold 8 around the peripheries of the front side rail 38. Plates 50, 52, 64, 66 may be supplied as a rectangular-shaped channel hollow tube where modifications, e.g., the cutting of the holes to accommodate the front side rails 38 can be subsequently made and braces 24 and side plates 70 can be added, e.g., by welding, to further ensure the rigidity of the manifold-front side rail connection. Plates 50, 52, 64, 66 may also be supplied separately but assembled and fixed together by welding. In fixing a rear side rail 40 to manifold 10, a cutout or hole is provided in plate 56 to allow the rear side rail 40 through the cutout until its end hits plate 54. As such, plate 54 serves as a stop or backing plate for the rear side rail 40 which is then welded to manifold 10 around the peripheries of the rear side rail 40. Plates 54, 56, 64, may be supplied as a rectangular-shaped channel hollow tube where modifications, e.g., the cutting of the holes to accommodate the rear side rails 40 can be subsequently made and braces 24 and side plates 70 can be added, e.g., by welding, to further ensure the rigidity of the manifold-rear side rail connection. Referring to FIG. 5, it shall also be noted that a notch 68 is disposed on the top surface 64 of the rear manifold 10 and the top surface of the rear manifold 10 with a depth 84 of about 3 inches and a width 86 of about 12-16 inches. This notch 68 may be useful as a step for passengers of the low-floor bus 2 to reach seats disposed at the rear end of the bus 2. A similar notch 68 is disposed on the front manifold 8 to allow the driver's access to the enclosure 82. In a preferred embodiment, the distance 78 between top surface of ramp module and pavement or the ride height is no more than about 15 inches and the clearance 76 of a vehicle equipped with a present floor support structure is no lower than about 7 inches during transit. The low-floor provides enhanced accessibility during the boarding and deboarding process of a light duty paratransit vehicle for both ambulatory and non-ambulatory passengers and the low-floor is configured such that it is as close to level as possible from front to back, i.e., up to only about 1-2-degree pitch while in transit and while boarding and deboarding. When a low-floor bus "kneels," hydraulic or pneumatic systems are typically used to lower the front entrance of the bus closer to the curb. This reduces the height difference between the curb and the bus floor, making it easier for passengers to step onto or off the bus or wheel onto or off the bus. The present support structure is configured such that while kneeling, the floor height is configured to meet Americans with Disabilities Act (ADA) requirements of 12 inches for a ramp of about 51 inches in length and about 30 inches in width. The low-floor is configured to accommodate two wheelchair positions positioned front to back and having an envelope of about 52 inches x about 30 inches each for each wheelchair user. These positions can be nested and not offset. A third wheelchair position can be located curbside and adjacent to the rearmost streetside position with a passenger door disposed at the forward end of the enclosure or it can be located curbside and adjacent to the forwardmost wheelchair position with a passenger door disposed at the rear end of the enclosure.

Figure 8:
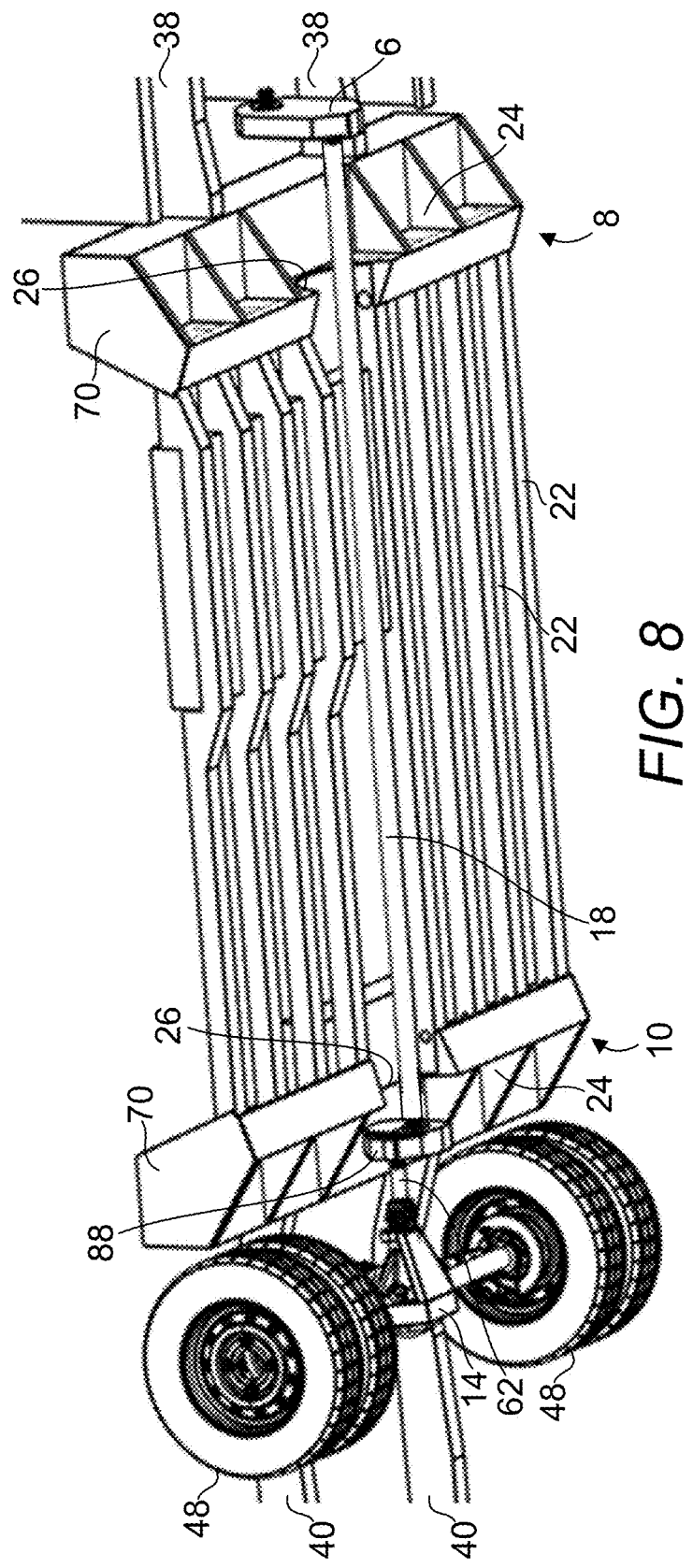
FIG. 8 is a diagram depicting another embodiment of the present floor support structure, depicting the use of a second transfer case to connect the second drive shaft to the differential.

FIG. 8 is a diagram depicting another embodiment of the present floor support structure, depicting the use of a second transfer case to connect the second drive shaft 18 to the differential 14. In this embodiment, the support structure further includes the second transfer case 88 disposed on the rear end of the floor support structure for receiving the second drive shaft 18 and transferring its motive force via a third drive shaft 62 to drive the rear ground-contacting wheels 48. This connection allows the use of a direct and straight shaft 62 between the second shaft 18 and the differential 14.

It shall be noted that all the figures disclosed herein are useful for showing buses with single rear wheels. In some circumstances, buses with dual rear wheels may be used as well, necessitating the width 44 of floor to be configured according to the rear wheel configuration.

Figure 9:
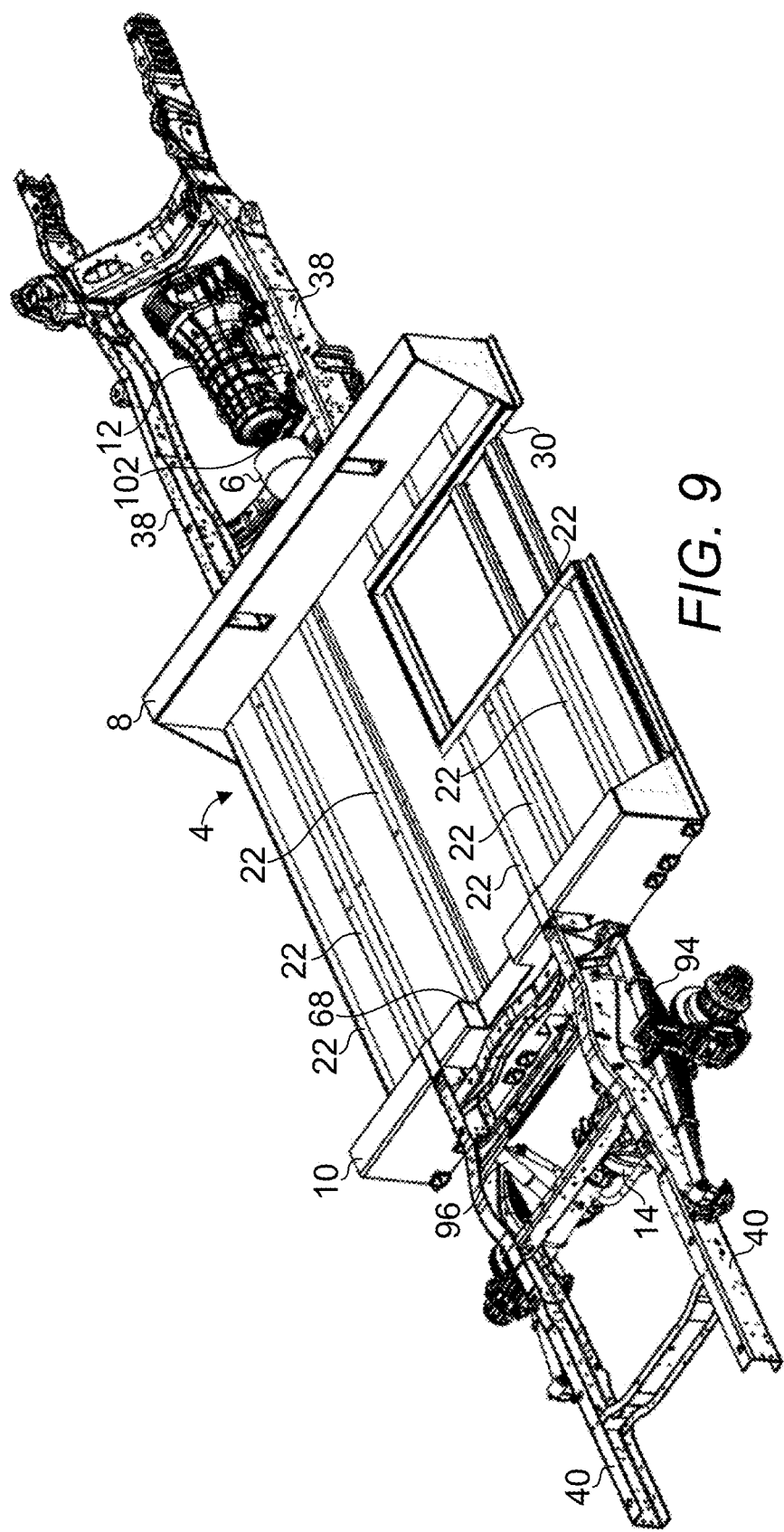
FIG. 9 is a top side rear perspective view of a floor support structure of a low-floor bus, depicting the floor support structure attached to side rails.
Figure 10:
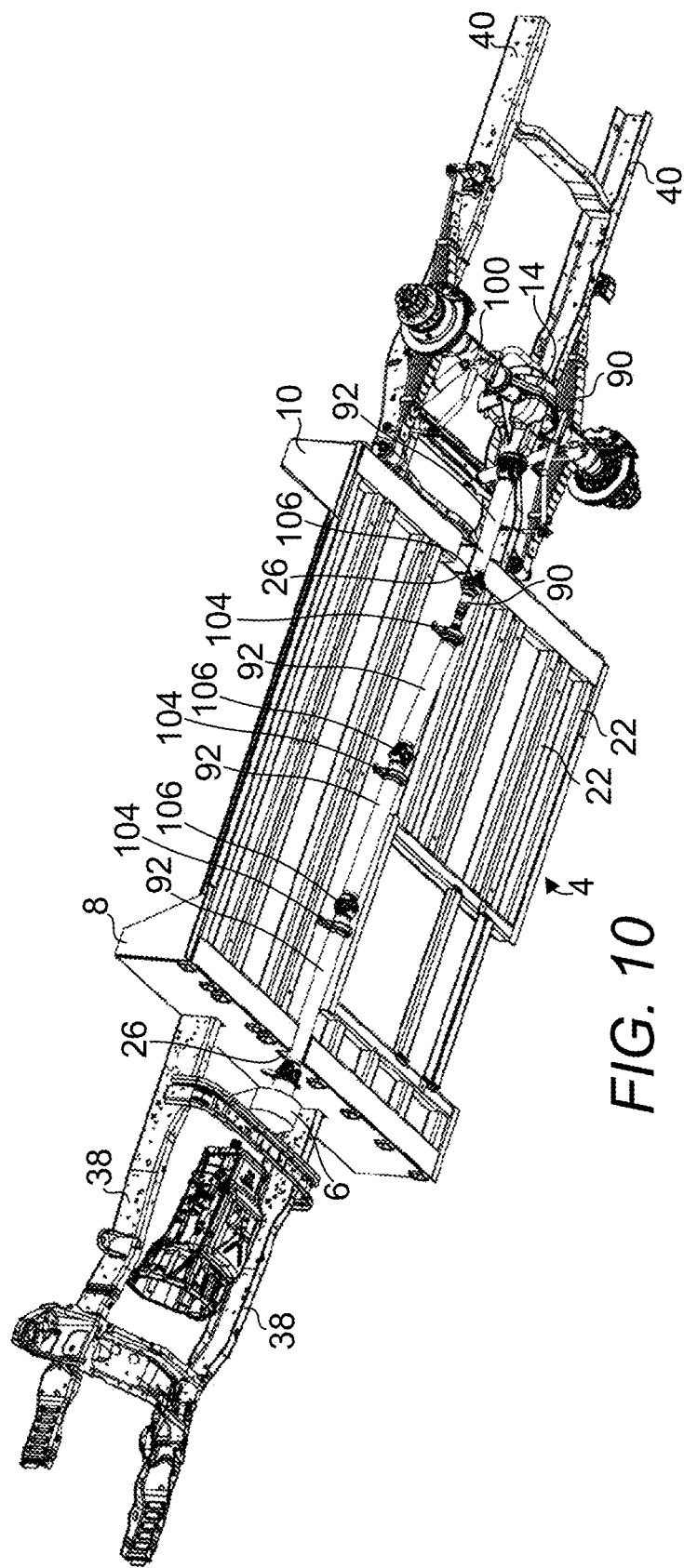
FIG. 10 is a bottom side front perspective view of the floor support structure of FIG. 9.
Figure 11:
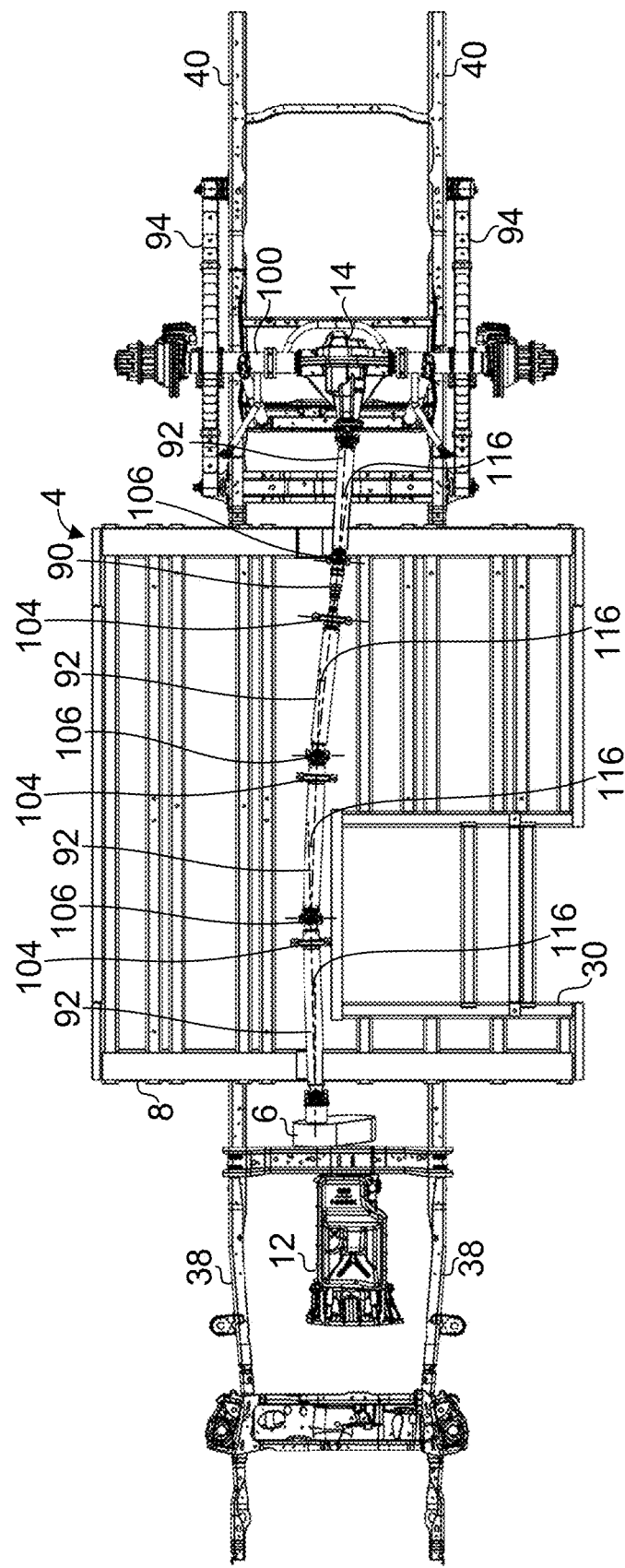
FIG. 11 is a bottom view of the floor support structure of FIG. 9.
Figure 12:
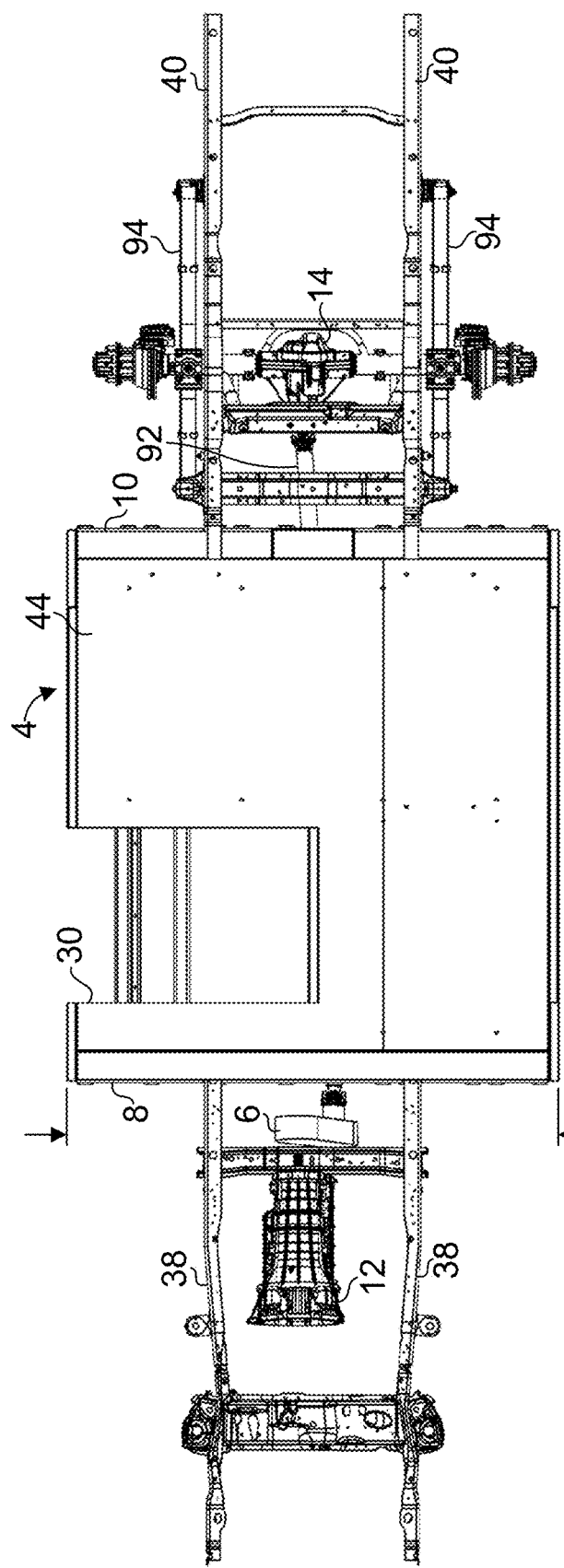
FIG. 12 is a top view of the floor support structure of FIG. 9.
Figure 13:
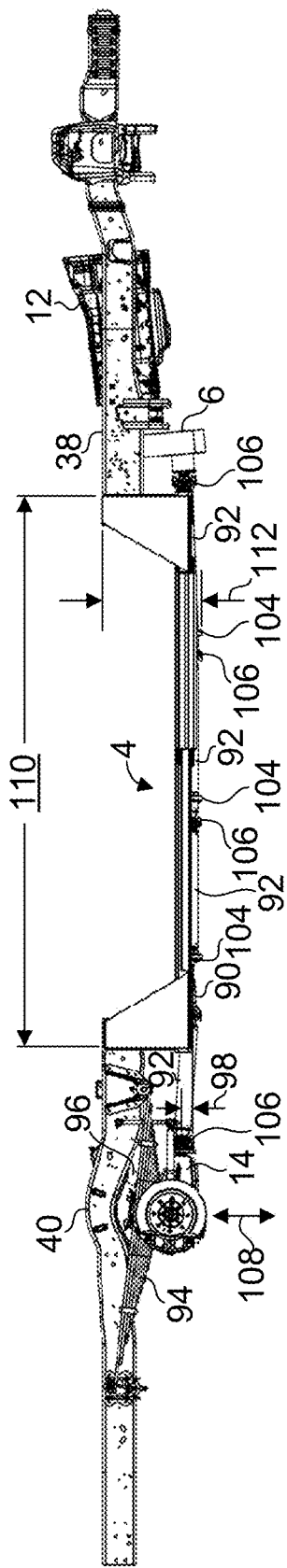
FIG. 13 is a right side view of the floor support structure of FIG. 9.
Figure 14:
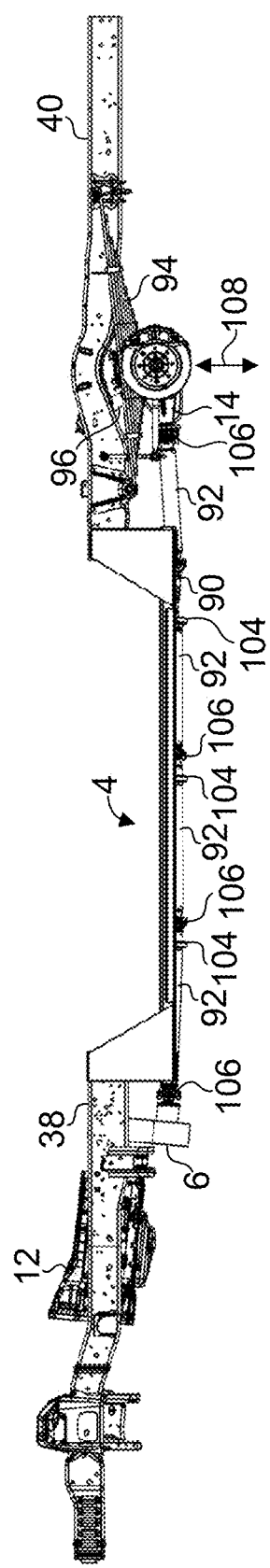
FIG. 14 is a left side view of the floor support structure of FIG. 9.
Figure 15:
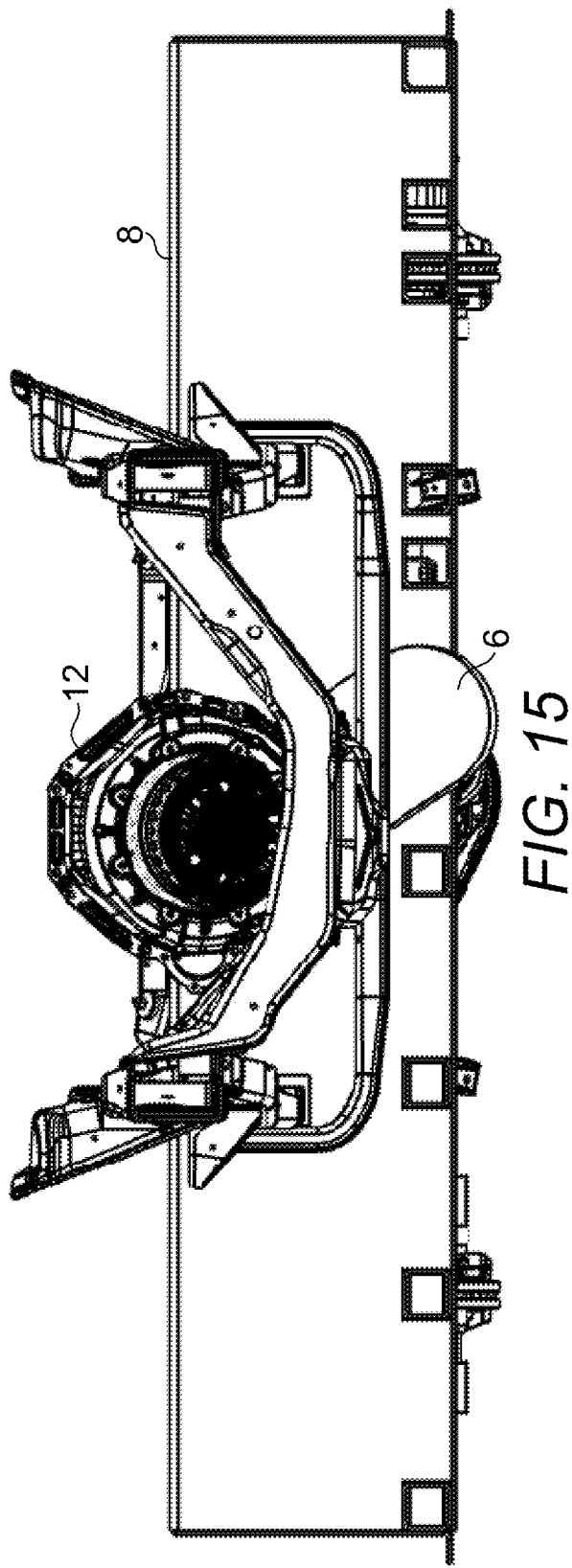
FIG. 15 is a front view of the floor support structure of FIG. 9.
Figure 16:
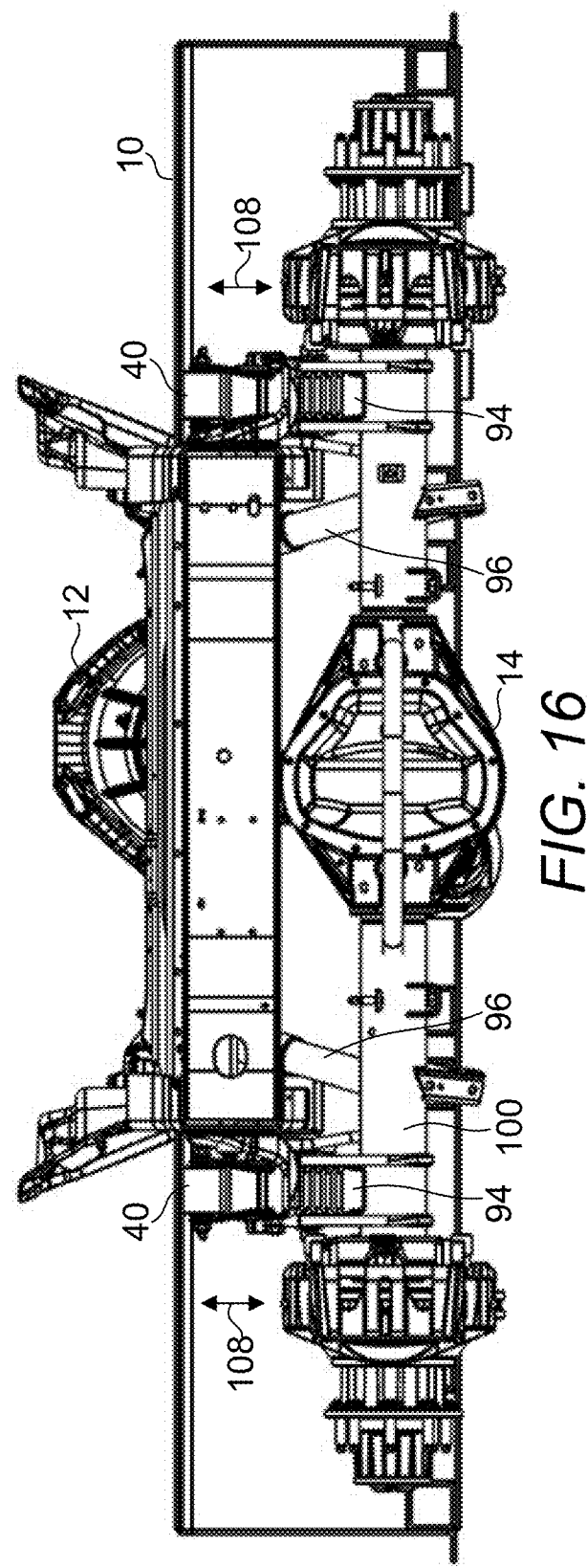
FIG. 16 is a rear view of the floor support structure of FIG. 9.

FIG. 9 is a top side rear perspective view of a floor support structure 4 of a low-floor bus, depicting the floor support structure 4 attached to side rails 38, 40. FIG. 10 is a bottom side front perspective view of the floor support structure of FIG. 9. FIG. 11 is a bottom view of the floor support structure of FIG. 9. FIG. 12 is a top view of the floor support structure of FIG. 9. FIG. 13 is a right side view of the floor support structure of FIG. 9. FIG. 14 is a left side view of the floor support structure of FIG. 9. FIG. 15 is a front view of the floor support structure of FIG. 9. FIG. 16 is a rear view of the floor support structure of FIG. 9. Again, the floor support structure 4 is useful for essentially bridging the gap between front side rails 38 and rear side rails 40, supporting a drivetrain which connects the transmission 12 at the front end of a low-floor bus to a differential disposed at the rear end of the low-floor bus and supporting a portion of the enclosure within which passengers are accommodated and the passengers themselves. No engine, front axle and associated components, e.g., the front leaf springs, shock absorbers, CV joints, front wheels, cab, passenger enclosure and rear wheels, are shown in order to more particularly show only the critical details of the floor support structure 4 and a manner in which it interfaces with a transmission 12. Again, the floor support structure 4 is configured to receive front side rails 38 on the front end of the floor support structure 4 and rear side rails 40 on the rear end of the floor support structure 4. A first transfer case 6 is configured to receive a first drive shaft from the transmission 12 of the low-floor bus on a first end of the first transfer case 6, receiving the transmission's output on the input end of the first transfer case 6 and transferring motive power of the transmission 12 to an output disposed at a level lower than its input. A second drive shaft is configured to connect an output of the first transfer case to the rear differential 14. In the embodiment shown, the second drive shaft includes a slip joint 90 for accommodating the travel of the axle which includes the differential 14, as the axle accommodates uneven surfaces, bumps, or potholes with the aid of suspension system components, e.g., leaf springs 94, in absorbing the shocks and vibrations. Referring back to FIG. 9, other suspension system components include shock absorbers 96 which are also mounted on the axle 100. These suspension system components 94, 96 ensure a smoother ride by dampening the impact that would otherwise be directly transmitted to the low-floor bus and passengers. In one embodiment not shown, the suspension system components may be replaced with a suspension system marketed under the tradename LiquidSpring® by LiquidSpring Technologies, Inc. of Santa Fe Springs, California. This is essentially a suspension system containing a compressible liquid that absorbs shock and vibrations caused by a road profile and it can be configured to allow a floor supported on the floor support structure 4 to be lowered to ease passengers' entry or exit from the low-floor bus and raised to allow sufficient clearance under the floor support structure 4 for travel. The suspension system may be replaced with air bags although less desirably so due to their lower durability compared to other options. The rear axle 100 transmits the rotational force from the differential 14 to the wheels, while the differential 14 ensures that the wheels can rotate at different speeds as needed, particularly when turning. In the embodiment shown, the second shaft includes a plurality of shaft segments 92 connected using universal joints (U-joints) 106 and supported using support bearings 104 attached to bottom surfaces of the floor support structure 4. At a first end, the second shaft receives power from an output of a power source, i.e., an output or output shaft of a transfer case or any output of a power source, e.g., an engine or a motor, mechanical or otherwise, that is made available at the first end of the second shaft. The shaft segments 92 allow the second drive shaft to navigate a path, e.g., around the cutout 30, with deviations 116 from a shaft segment 92 to the next shaft segment 92, for accommodating the second drive shaft while allowing power transmission from the transmission 12 to the rear differential 14 to continue without interruptions. The use of U-joints allows the second shaft to be biased laterally, i.e., from one side to another side of the floor support structure 4 from the front end to the rear end of the floor support structure 4 to allow the output shaft of the first transfer case 6 to be connected to the rear differential 14 more smoothly, i.e., without any significant drivetrain resistance due to the change in direction of a shaft. The rearmost shaft segment 92 is then connected to the slip joint 90. The slip joint 90 essentially allows the second shaft to "expand" or "contract" in length in order to accommodate the up-and-down motions of the differential 14 to which the slip joint is connected to, due to the use of leaf springs 106, and shock absorbers, etc., which together afford the differential 14 such motions to soften the ride of the low-floor bus. Although not shown, as in the case disclosed elsewhere herein, rear ground-contacting wheels are configured to be mounted on the output shafts of the differential 14. It shall be seen that, the slip joint 90 is configured to accommodate movements of the differential with respect to the floor support structure 4, as the front end of slip joint 90 is rotatably supported using a support bearing 104, while maintaining a mechanical connection between the first transfer case 6 and the differential 14. In one embodiment, the slip joint can be a slip yoke or a constant velocity (CV) joint. In one embodiment not shown, the CV joint is a double cardan CV joint that uses two universal joints to further reduce vibrations of the second shaft and provide a smoother operation to the low-floor bus. In one embodiment, the length 110 of the floor support structure 4 is about 8 ft to about 9 ft. In one embodiment, the height 112 of the floor support structure 4 including the second shaft and any support bearing 104 is about 1 ft to about 2 ft. In one embodiment, the width 114 of the floor support structure is about 7 ft to about 8 ft. Referring back to FIG. 9, in one embodiment, a misalignment coupler 102 is required to functionally connect the transmission 12 of a Ford® E Series chassis to the first transfer case 6. The misalignment coupler 102 is essentially a mechanical component that compensates for slight misalignments between the transmission 12 and the first transfer case 6. The transmission 12 transmits power from an engine of the Ford® E Series chassis to the rear axle 100. In an ideal setup where the entire vehicle is designed and built from the ground up, the transmission output shaft and the transfer case input shaft would be perfectly aligned. However, due to manufacturing tolerances, installation variations, or the vehicle's movement under load, there may be small angular or positional misalignments. The misalignment coupler 102 assists in absorbing misalignment where it allows for some flexibility in the connection, ensuring that even if the shafts are not perfectly aligned, the drivetrain can still function smoothly to reduce stress on components and to improve reliability of the drivetrain. The misalignment coupler 102 prevents excessive wear or damage to the shafts, bearings, and seals in the drivetrain and it extends the lifespan of the drivetrain components by reducing the transmission of vibration, shock loads, or forces that could damage the transmission 12 or the first transfer case 6. Although not shown in FIGS. 9-16, it is conceivable that the same or similar ramp modules that are shown mounted in the space allotted by the cutout 30 elsewhere herein can be used in the cutout 30 shown in FIGS. 9-16.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A support structure for a low-floor bus having front wheels and rear wheels, said support structure comprising:
   (a) a floor support structure having a front end and a rear end, wherein said floor support structure configured to receive front side rails on said front end of said floor support structure and rear side rails on said rear end of said floor support structure;
   (b) a cutout disposed on a lateral edge of said floor support structure;
   (c) a plurality of support bearings each attached to a bottom surface of said floor support structure; and
   (d) a drive shaft comprising a plurality of shaft segments and a slip joint, all at least partially supported on said plurality of support bearings, said plurality of shaft segments are configured to be disposed around said cutout, wherein a first end of said drive shaft is configured to be connected to a power source and a second end of said drive shaft is configured to be connected to a rear differential to drive the rear wheels.

2. The support structure of claim 1, wherein said slip joint is a joint selected from the group consisting of a slip yoke and a constant velocity (CV) joint.

3. The support structure of claim 1, wherein said floor support structure comprises a front manifold, a rear manifold, a support structure connecting said front manifold and said rear manifold and a gap in each of said front manifold and said rear manifold of at least about 6-8 inches in width to accommodate the drive shaft.

4. The support structure of claim 1, wherein said floor support structure comprises a front manifold, a rear manifold and a plurality of beams connecting said front manifold and said rear manifold.

5. The support structure of claim 4, wherein at least one of said plurality of beams is a C-channel, an I-beam, a hollow channel and a solid bar.

6. The support structure of claim 1, further comprising a ramp module configured to be disposed in said cutout of said floor support structure.

7. The support structure of claim 6, wherein said ramp module is a ramp module selected from the group consisting of a retractable ramp module and a folding ramp module.

8. A support structure for a low-floor bus having front wheels and rear wheels, said support structure comprising:
   (a) a floor support structure having a front end and a rear end, wherein said floor support structure configured to receive front side rails on said front end of said floor support structure and rear side rails on said rear end of said floor support structure;
   (b) a transfer case disposed at said front end of said floor support structure, wherein said transfer case is configured to receive a first drive shaft from the low-floor bus on a first end of said transfer case; and
   (c) a second drive shaft comprising a slip joint, wherein said transfer case is further configured to receive said second drive shaft at a second end of said transfer case, wherein the second drive shaft is configured to mechanically connect said transfer case with a differential to drive the rear wheels on a ground, an output of the second drive shaft is configured to be received at the differential and said slip joint is configured to accommodate movements of the differential with respect to said floor support structure while maintaining a mechanical connection between said transfer case and the differential.

9. The support structure of claim 8, wherein said slip joint is a joint selected from the group consisting of a slip yoke and a constant velocity (CV) joint.

10. The support structure of claim 8, wherein at least a portion of said second drive shaft is configured to be supported by said floor support structure.

11. The support structure of claim 8, wherein said floor support structure comprises a front manifold, a rear manifold, a support structure connecting said front manifold and said rear manifold and a gap in each of said front manifold and said rear manifold of at least about 6-8 inches in width to accommodate the second drive shaft.

12. The support structure of claim 8, wherein said first drive shaft is configured to mechanically connect said transfer case with a transmission of the low-floor bus.

13. The support structure of claim 8, wherein said floor support structure comprises a front manifold, a rear manifold and a plurality of beams connecting said front manifold and said rear manifold.

14. The support structure of claim 13, wherein at least one of said plurality of beams is a C-channel, an I-beam, a hollow channel and a solid bar.

15. The support structure of claim 8, further comprising a cutout disposed in said floor support structure, wherein said cutout is configured for accommodating a ramp module.

16. The support structure of claim 8, further comprising a ramp module configured to be disposed in a cutout of said floor support structure.

17. The support structure of claim 16, wherein said ramp module is a ramp module selected from the group consisting of a retractable ramp module and a folding ramp module.

18. A support structure for a low-floor bus having front wheels and rear wheels, said support structure comprising:
   (a) a floor support structure having a front end and a rear end, wherein said floor support structure is configured to receive front side rails on said front end of said floor support structure and rear side rails on said rear end of said floor support structure;
   (b) a transfer case disposed at said front end of said floor support structure, wherein said transfer case is configured to receive a first drive shaft from the low-floor bus on a first end of said transfer case;
   (c) a plurality of support bearings each attached to a bottom surface of said floor support structure; and
   (d) a second drive shaft comprising a plurality of shaft segments supported on said plurality of support bearings, wherein said transfer case is further configured to receive a front end of said second drive shaft at a second end of said transfer case and said second drive shaft is configured to be connected to a differential to a rear end of said second drive shaft to drive the rear wheels.

19. The support structure of claim 18, wherein said second drive shaft further comprises a slip joint.

20. The support structure of claim 18, wherein said slip joint is a joint selected from the group consisting of a slip yoke and a constant velocity (CV) joint.

* * * * *